US012147145B2

(12) United States Patent
Goun et al.

(10) Patent No.: US 12,147,145 B2
(45) Date of Patent: Nov. 19, 2024

(54) RADIO FREQUENCY (RF) COMB ENABLED NONLINEAR MULTIBAND RADAR SYSTEM

(71) Applicant: The Trustees of Princeton University, Princeton, NJ (US)

(72) Inventors: Alexei Goun, Plainsboro, NJ (US); Herschel Rabitz, Lawrenceville, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 212 days.

(21) Appl. No.: 17/920,128

(22) PCT Filed: Apr. 22, 2021

(86) PCT No.: PCT/US2021/028621
§ 371 (c)(1),
(2) Date: Oct. 20, 2022

(87) PCT Pub. No.: WO2021/216855
PCT Pub. Date: Oct. 28, 2021

(65) Prior Publication Data
US 2023/0152664 A1 May 18, 2023

Related U.S. Application Data

(60) Provisional application No. 63/013,708, filed on Apr. 22, 2020.

(51) Int. Cl.
*G02F 1/35* (2006.01)
*G01S 7/41* (2006.01)
*G01S 7/481* (2006.01)

(52) U.S. Cl.
CPC .............. *G02F 1/353* (2013.01); *G01S 7/415* (2013.01); *G01S 7/4816* (2013.01); *G02F 2203/56* (2013.01)

(58) Field of Classification Search
None
See application file for complete search history.

(56) References Cited

U.S. PATENT DOCUMENTS

| 7,973,697 B2 * | 7/2011 | Reilly | G01S 13/887 |
| | | | 705/13 |
| 8,903,669 B1 * | 12/2014 | Holly | G01S 13/887 |
| | | | 702/75 |

(Continued)

FOREIGN PATENT DOCUMENTS

| WO | 2018206006 A1 | 11/2018 |
| WO | 2020160026 A1 | 8/2020 |

OTHER PUBLICATIONS

D. Meena, et al., "Coherent Radar waveform Generation and IF signal detection using single laser source for Multi band Sensor Network Applications," 2022 IEEE International Conference on Electronics, Computing and Communication Technologies (CONECCT), Bangalore, India, 2022, pp. 1-6. (Year: 2022).*

(Continued)

*Primary Examiner* — Rhonda S Peace
(74) *Attorney, Agent, or Firm* — MEAGHER EMANUEL LAKS GOLDBERG & LIAO, LLP

(57) ABSTRACT

Disclosed herein is the detection of dangerous dielectric materials (explosives) and dangerous non-explosive and/or prohibited items. The detection is based on a broad bandwidth nonlinear radar system, driven by a highly stable optical frequency comb. The disclosed approach allows for the spatial resolution of the interrogated object in complex settings. Detection of dangerous materials and non-explosive chemical prohibited items is disclosed. The chemicals can be identified under clothing, within boxes, or other dielectric enclosures.

18 Claims, 12 Drawing Sheets

(56) References Cited

U.S. PATENT DOCUMENTS

| | | |
|---|---|---|
| 10,200,128 B1 | 2/2019 | Mefford et al. |
| 2013/0154611 A1 | 6/2013 | Pate et al. |
| 2015/0379356 A1 | 12/2015 | Nikolova et al. |
| 2018/0216996 A1 | 8/2018 | Kieu |
| 2021/0063243 A1 | 3/2021 | Anandarajah et al. |
| 2023/0152664 A1* | 5/2023 | Goun ............... G01S 7/282 359/326 |
| 2023/0194702 A1* | 6/2023 | Goun ............... G01S 13/878 342/22 |
| 2023/0273282 A1* | 8/2023 | Goun ............... G01R 33/441 324/300 |

OTHER PUBLICATIONS

International Search Report and Written Opinion for corresponding PCT Application No. PCT/US2021/028621, dated Jul. 26, 2021.

Ross, D. D. et al., "Low-profile high-power optically addressed phased array antenna", Journal of Lightwave Technology, vol. 35, No. 18, pp. 3894-3900, Sep. 15, 2017.

Mazzaro, G. J. and Sherbondy, K. D., "Harmonic nonlinear radar: from benchtop experimentation to short-range wireless data collection", Radar Sensor Technology XXIII, International Society for Optics and Photonics, May 3, 2019.

Lu, Y. et al., "A Novel Scheme for Photonic Generation of Broadly Tunable Radio Frequency Signals", Asia Communications and Photonics Conference, Optical Society of America, Guangzhou, China, pp. 1-3, Nov. 2017.

Morozov, O. G. et al., "External amplitude-phase modulation of laser radiation for generation of microwave frequency carriers and optical poly-harmonic signals: an overview", Physics of Wave Processes and Radio Systems, vol. 18, No. 3-2, pp. 20-33, 2015.

Preussler, S. et al., "Optical signal generation and distribution for large aperture radar in autonomous driving," 2019 12th German Microwave Conference (GeMiC), IEEE, pp. 154-157, 2019.

* cited by examiner

RADIO FREQUENCY (RF) COMB ENABLED NONLINEAR MULTIBAND RADAR SYSTEM

CROSS REFERENCE TO RELATED APPLICATION

This application claims priority from U.S. Provisional Patent Application Ser. No. 63/013,708 filed Apr. 22, 2020, which is hereby incorporated by reference herein in its entirety.

TECHNICAL FIELD

This application pertains to concealed item detection via Electromagnetic Wave, nonlinear detection (Concealed Item Detection; e.g. "CID NLD;" via electromagnetic wave interrogation, e.g. illumination or probing, nonlinear detection, e.g. EM NLD").

BACKGROUND

Long wavelength (LW) radio frequency (RF) scanning is among techniques for non-intrusive scanning of persons to detect various prohibited items, e.g., firearms, bladed weapons, and explosives that may be concealed, for example, under clothing or in backpacks or other carry items. A significant benefit of LWRF scanning, based on physics, is an ability to penetrate and detect such items through clothing, even heavy clothing, and through canvas and leather structure of backpacks and briefcases, without requiring RF energy even approaching health-concerning levels.

The detection and identification of materials is and has been a needed requirement and the basis for many products across diverse industries and has become more of a need and challenging in recent years with the prevalence of public venue bombings and casualties from traditional firearms. A number of techniques have been used to probe items or objects with some type of emission, e.g. electromagnetic waves that probe, interrogate or illuminate items or objects for security screening purposes. The interrogation may be screening for energetic materials (e.g., Improvised Explosive Devices, bombs) or venue-specific, non-explosive prohibited items (NEPIs).

Radar systems are widely used, technique for the detection of object locations by making measurements of the reflected (returned) pulses from the illuminated or interrogated objects. Radar systems has a limited capability to accurately determine very small, cubic centimeter sized, object, molecular composition; and accurately discriminate between benign objects, explosives or NEPIs, e.g. multiple objects within a small field of view needed for rapidly screening people or objects at stand-off distances of meters or 10 s of meters, e.g. accurate threat determination before entering a building. Size, weight and form factors are also key to use in many buildings or venues; deployment of the large systems typically utilized in airports for people screening checkpoints, is challenging for many public venues.

This patent provides a novel application of radar techniques, employing the techniques of non-linear detection to achieve enhanced, accurate detection of chemical compounds, energetic materials, NEPIs and with accurate discrimination in a stand-off application handling people screening in groups, as naturally walking on sidewalks 10 s of meters before reaching a building or venue for entry.

An area of specific interest as disclosed in the unique methodology and implementation herein is interrogation and detection of energetic materials or NEPIs at a significant distance (e.g. that can be on the order of 10 s of meters or greater) from the sensor or sensors performing the object interrogation. Interrogation and detection of hazardous materials and explosives at a significant distance is important in order to provide safety of people outside a venue, inside a venue and including workers providing venue security. Additionally, by detection at a distance, adequate time may be provided to lock the doors before an adversary or assailant is able to enter the venue; hence providing harm mitigation at a distance.

Examples of energetic materials are: explosives, fireworks, and other combustibles carried by people or found in packages, luggage, and other containers. Threats, e.g. energetic materials and NEPIs, may be in proximity to benign (safe) materials that are worn on a person or contained in backpacks or other containers. Hence, a challenge is discrimination of threats and benign items, at a distance, quickly to not impede people traffic at venues.

Also NEPIs, such as weapons, may be prevalent along with energetic materials in terrorist or criminal activities. Scenarios that have occurred in the USA and Worldwide, drive a need for detection and identification at a significant distance (also referred to as "stand-off"). A "stand-off" capability can be described as a capability that can monitor people and objects, automatically identify suspicious items at a distance. Unstructured security screening, e.g. does not require people to stand in lines at checkpoints, in combination with "stand-off" detection capability are key market needs. Key operational drivers and needs are for Standoff Detection with Unstructured Screening of large numbers of threats possessing highly accurate, quick detection to screen the groups of people approaching public venues, alarming on individual people and locations of threats individuals.

Thus, such a capability of mitigating harm at a distance, provided by the system in this application, can enable venue responses (alarm alerts for threats) in adequate time for appropriate, mitigating action responses such as locking doors, keeping adversaries outside of venue and notification of proper authorities. "Mitigating harm at a distance" applies many places where people congregate, such as houses of worship, schools, sports venues, shopping malls, resorts, amusement, places of employment, recreational parks and transportation systems, both public or private transportation.

Recent developments in semiconductor technology coupled with discovery of physical phenomenology of molecules enables the creation of new approaches to chemical signature identification as described by Lin, T.; Dutt, A.; Ji, X.; Phare, C. T.; Joshi, C.; Gordillo, O. A. J.; Shin, M. C.; Gaeta, A. L.; Lipson, M., Long-Term Stabilization and Operation of a Soliton Micro-Comb for 9-Days, CLEO: Science and Innovations, Optical Society of America: 2019; p STu3J. 5, which is shown for illustration.

The chemical signature identification methods coupled with discrimination methods from this application and advances in semiconductor technology provides a technical solution for the system described in this application.

A major challenge in discrimination is the prevalence of background benign items (e.g. non threat clutter) and the EM wave measurement response to probing chemical properties of the object and the object's geometry. The coupling between material (chemical) properties and the object's geometry is due to the wavelength of RF radiation being on the same order as the size of the object being detected, related to radar cross section, object geometry and illumination corresponding to regions of scattering Rayleigh, MIE and Optical wavelengths. The clutter can be caused by a variety of things, including extraneous objects outside people's profile or within the desired field of view of a person and intentionally place obscurants.

As an example of semiconductor component advances for building blocks, optically driven generation of multiple RF spectral signals across wide RF bandwidth has become available providing RF spectral signals of excellent stability for illuminating objects as described by Lu, Y; Wang, F.; Gu, J.; Shi, L.; Peng, M.; Lee, C.-h., A Novel Scheme for Photonic Generation of Broadly Tunable Radio Frequency Signals, Asia Communications and Photonics Conference, Optical Society of America: 2017; p Su4E.; Morozov, O. G.; Thin, G. I.; Morozov, G. A.; Nureev, I. I.; Misbakhov, R. S., External amplitude-phase modulation of laser radiation for generation of microwave frequency carriers and optical poly-harmonic signals: an overview, Optical Technologies for Telecommunications 2015, International Society for Optics and Photonics: 2016; p 980711; and Preussler, S.; Schwartau, F.; Schoebel, J.; Schneider, T., Optical signal generation and distribution for large aperture radar in autonomous driving, 2019 12th German Microwave Conference (GeMiC), IEEE: 2019; pp 154-157 which are shown for illustration.

Furthermore, an optical frequency comb (OFC), which traditionally utilizes an ultra-stable clock, e.g. an ultra-stable master oscillator or ultra-stable pulse train, important for probing objects, enables conversion by a broad bandwidth photodiode into various RF bands. Thus, multiple RF bands integrated onto a single chip or small package can permit operation as a fully coherent RF transmitter and receiving array for the generation of spectral lines, radiated to objects, inducing nonlinear effects in molecules for identification of threats from molecular nonlinear induced responses e.g. signatures from spectroscopic time-dependent characteristic susceptibility function of the molecule, that can be received by the receiver system of this invention.

BRIEF DESCRIPTION OF THE DRAWINGS

Description of various concepts and embodiments includes references to the accompanying figures which show illustrative, not limitative examples. It will be understood that figure graphics are scaled for readability and therefore various functions and features are not necessarily drawn with a scale consistent with physical implementations.

objects, chemical compounds in accordance with one or more embodiments.

Figure 3:
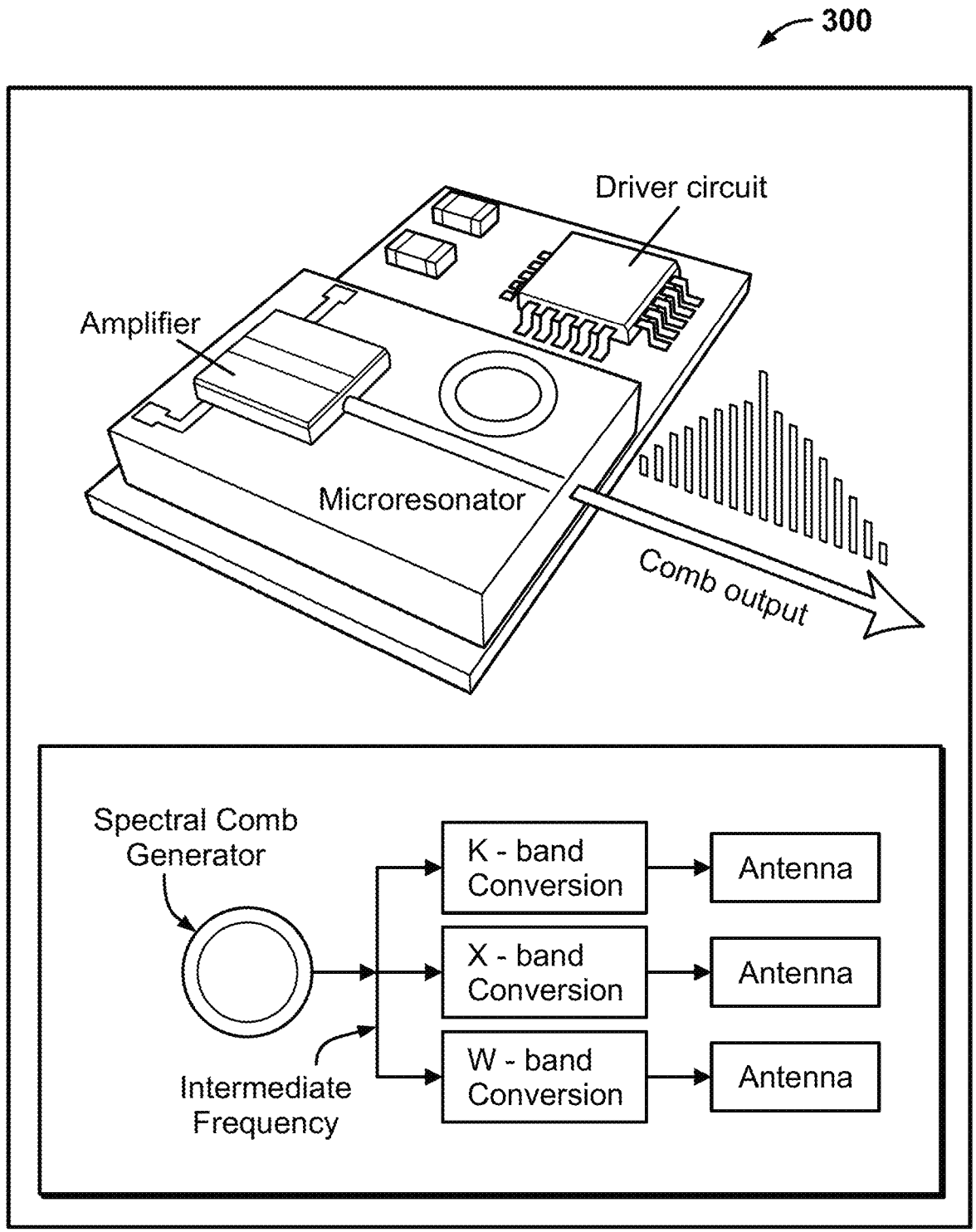

FIG. 3 shows a functional diagram utilizing spectral line comb generation and conversion to example interrogation-probe frequency bands with the spectral comb lines in accordance with one or more embodiments.

Figure 4:
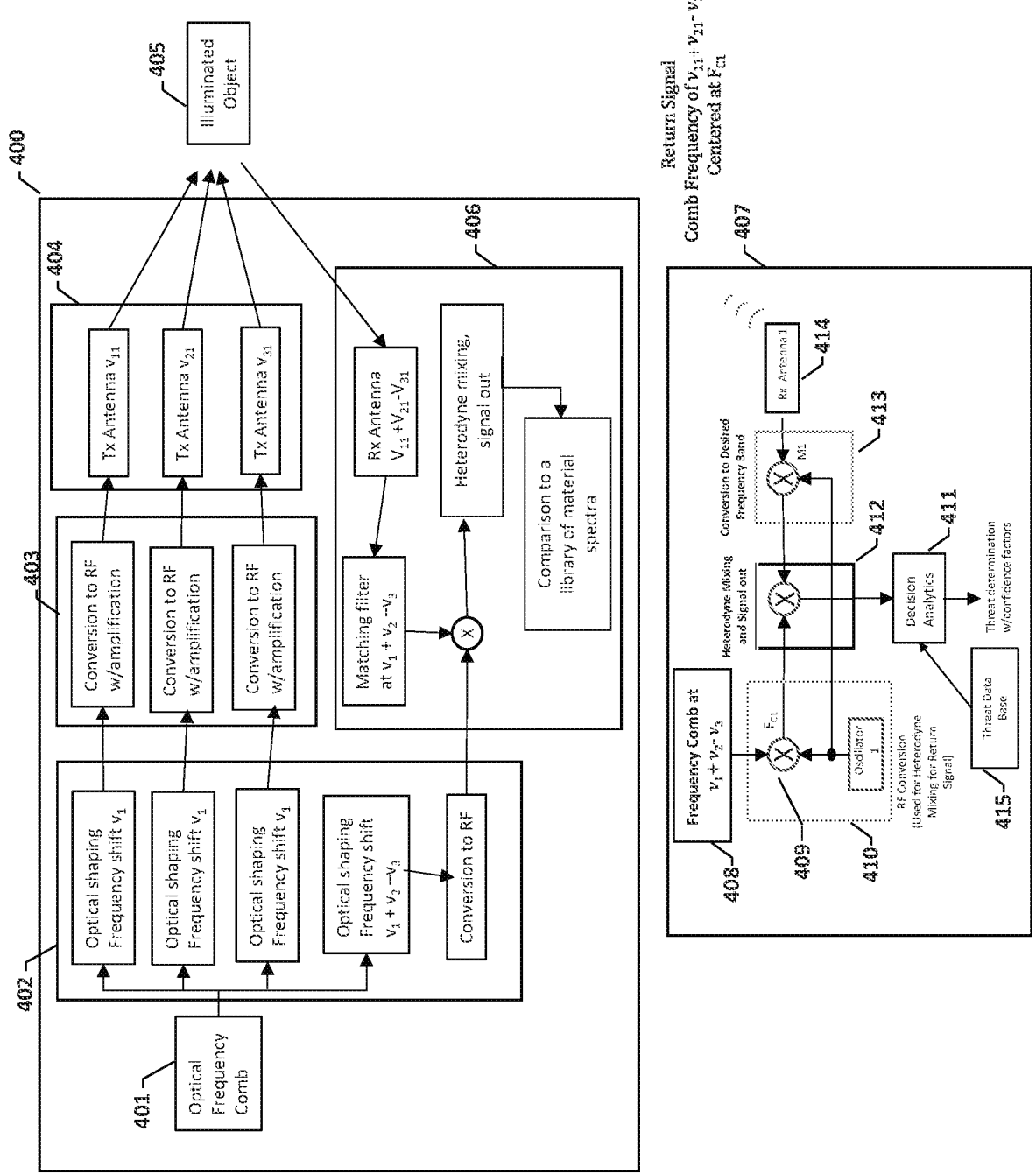

FIG. 4 shows an example functional diagram for frequency comb integration with RF converters and antennas and example frequency shifting of spectral comb lines for heterodyne mixing of return signal from substances of interest (SIs) in accordance with one or more embodiments.

Figure 5:
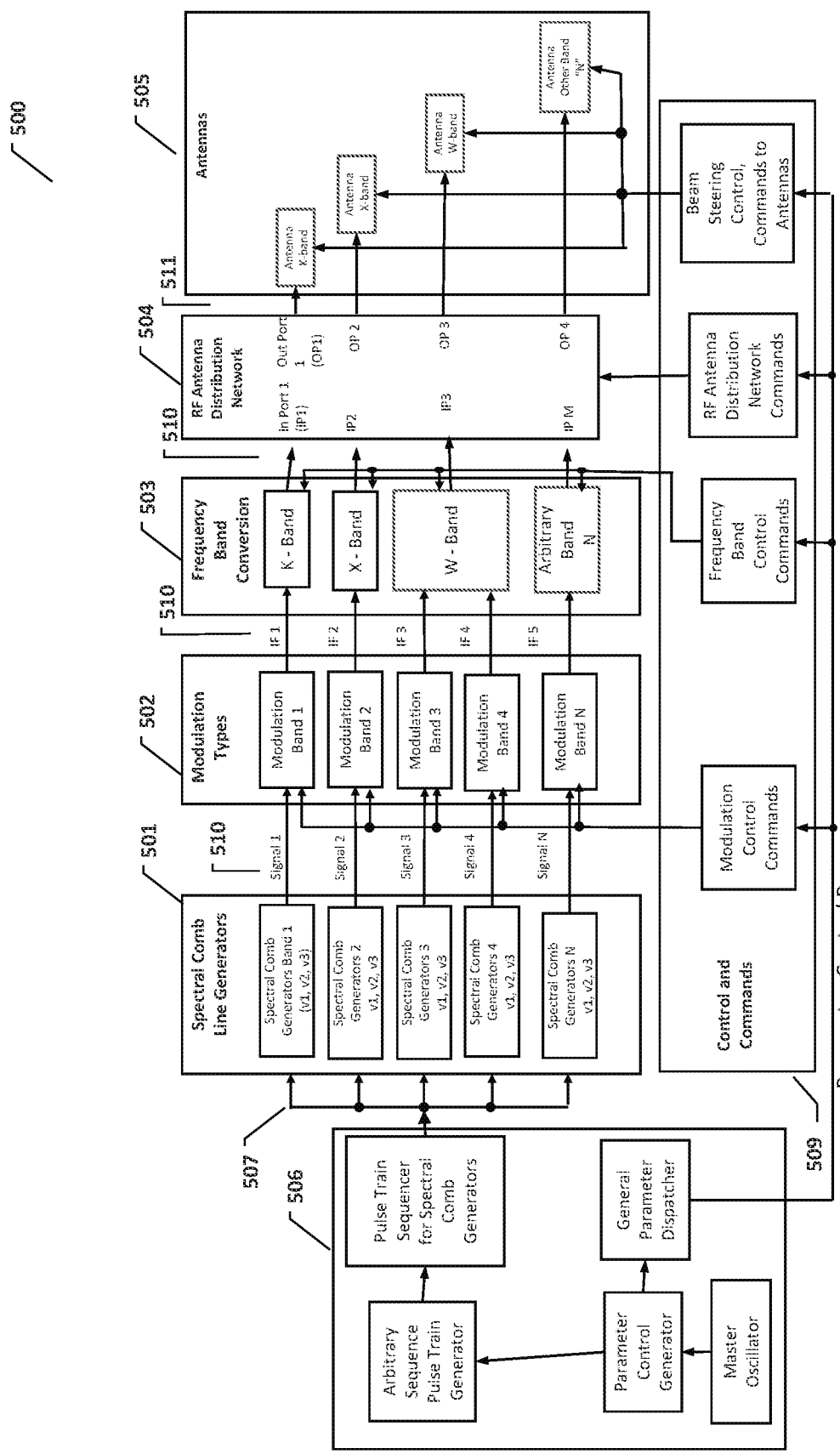

FIG. 5 shows the general block diagram structure of optically driven nonlinear radar enabled by an optical frequency comb in accordance with one or more embodiments.

Figure 6:
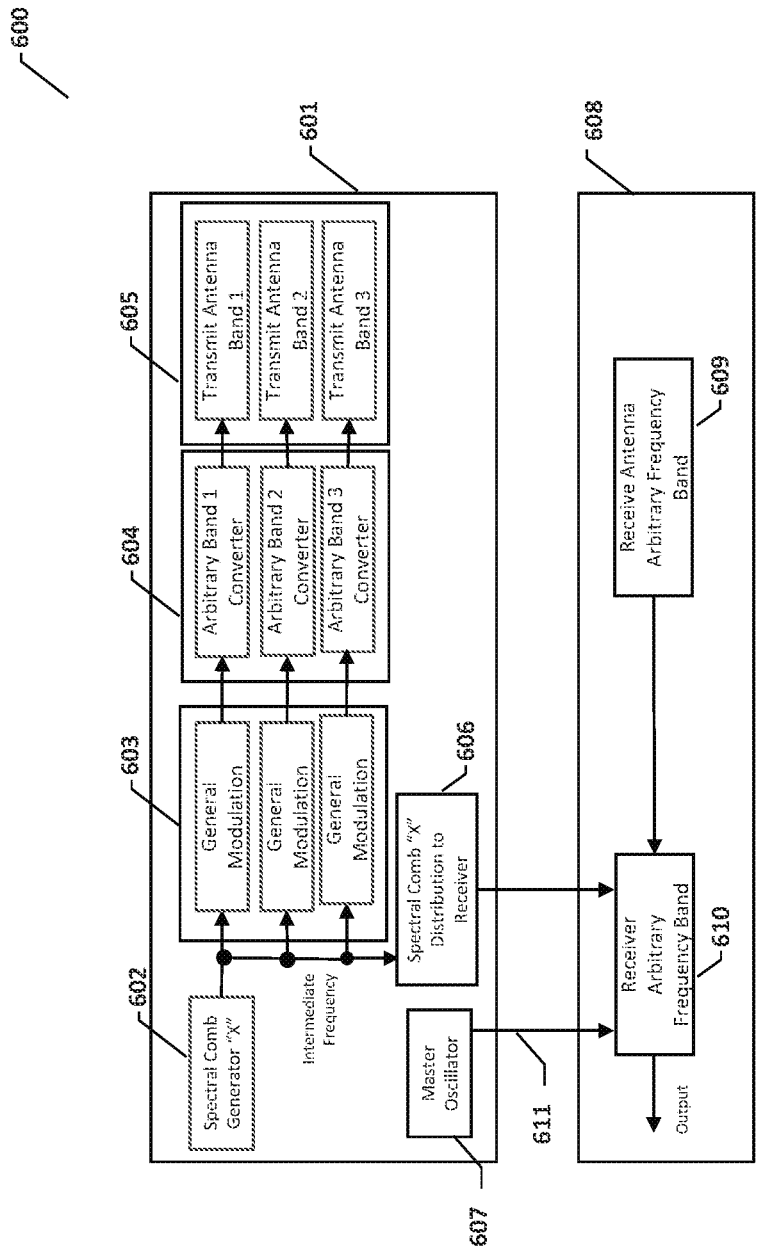

FIG. 6 shows a simplified Transmitter and Receiver with a spectral comb generator with a common master clock provided to the transmitter and receiver for coherent operation in accordance with one or more embodiments.

Figure 7:
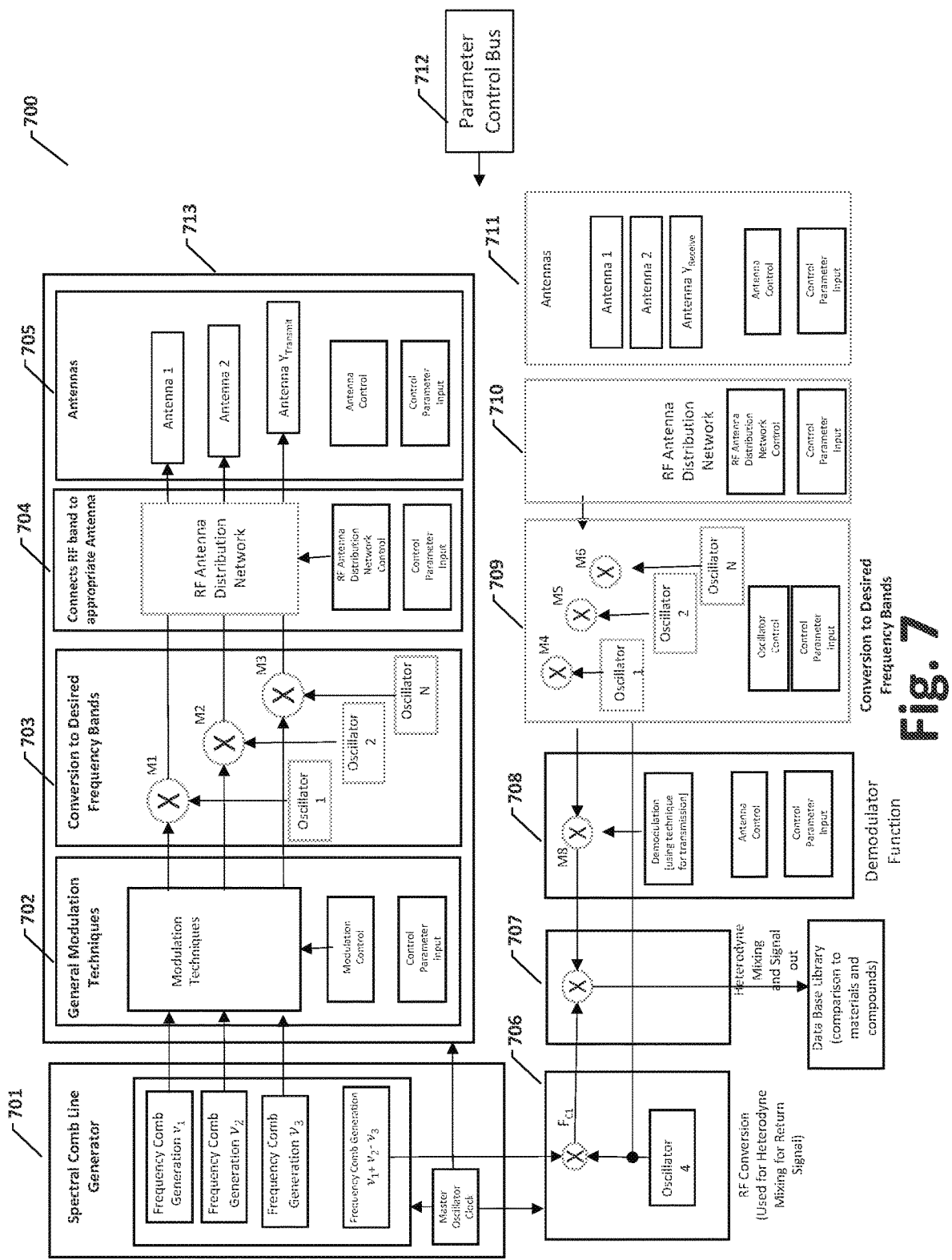

FIG. 7 shows a general system block diagram for applying modulation types to Spectral Comb Lines in accordance with one or more embodiments.

Figure 8:
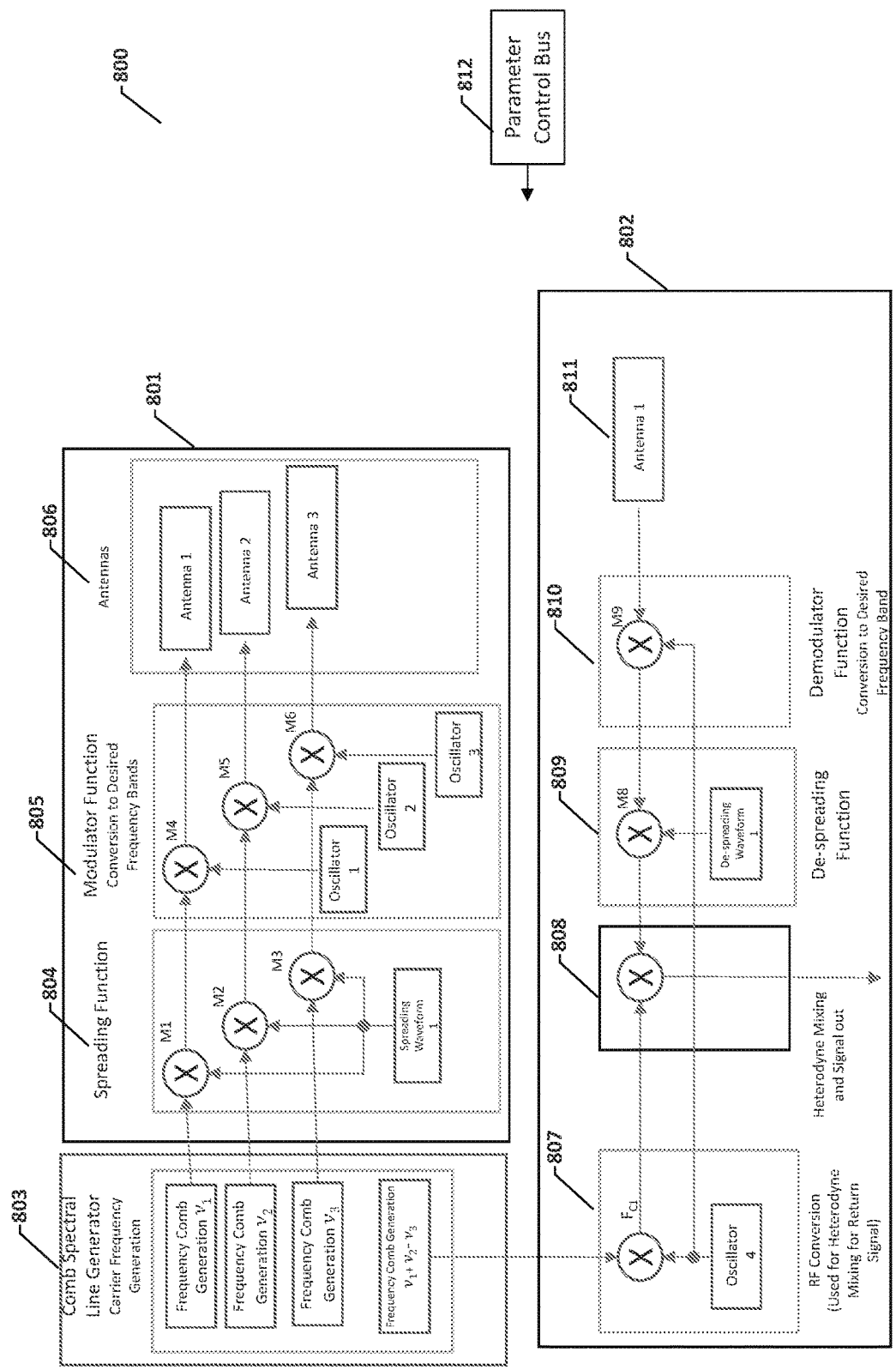

FIG. 8 shows a Direct Sequence Spread Spectrum (DSE SS) example of modulation applied to General System in accordance with one or more embodiments.

Figure 9:
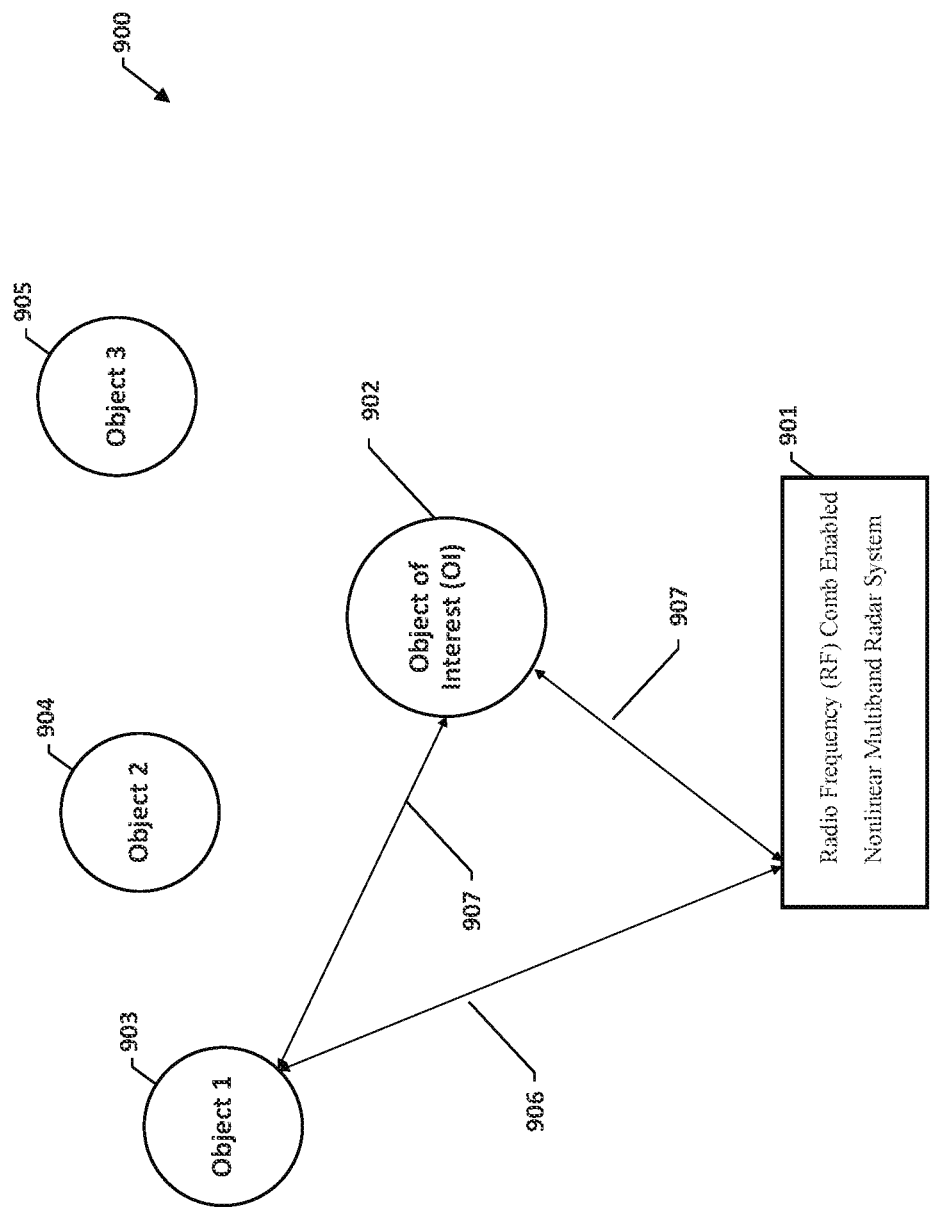

FIG. 9, shows occlusion mitigation from the Radio Frequency (RF) Comb Enabled Nonlinear Multiband Radar System in accordance with one or more embodiments.

Figure 10:
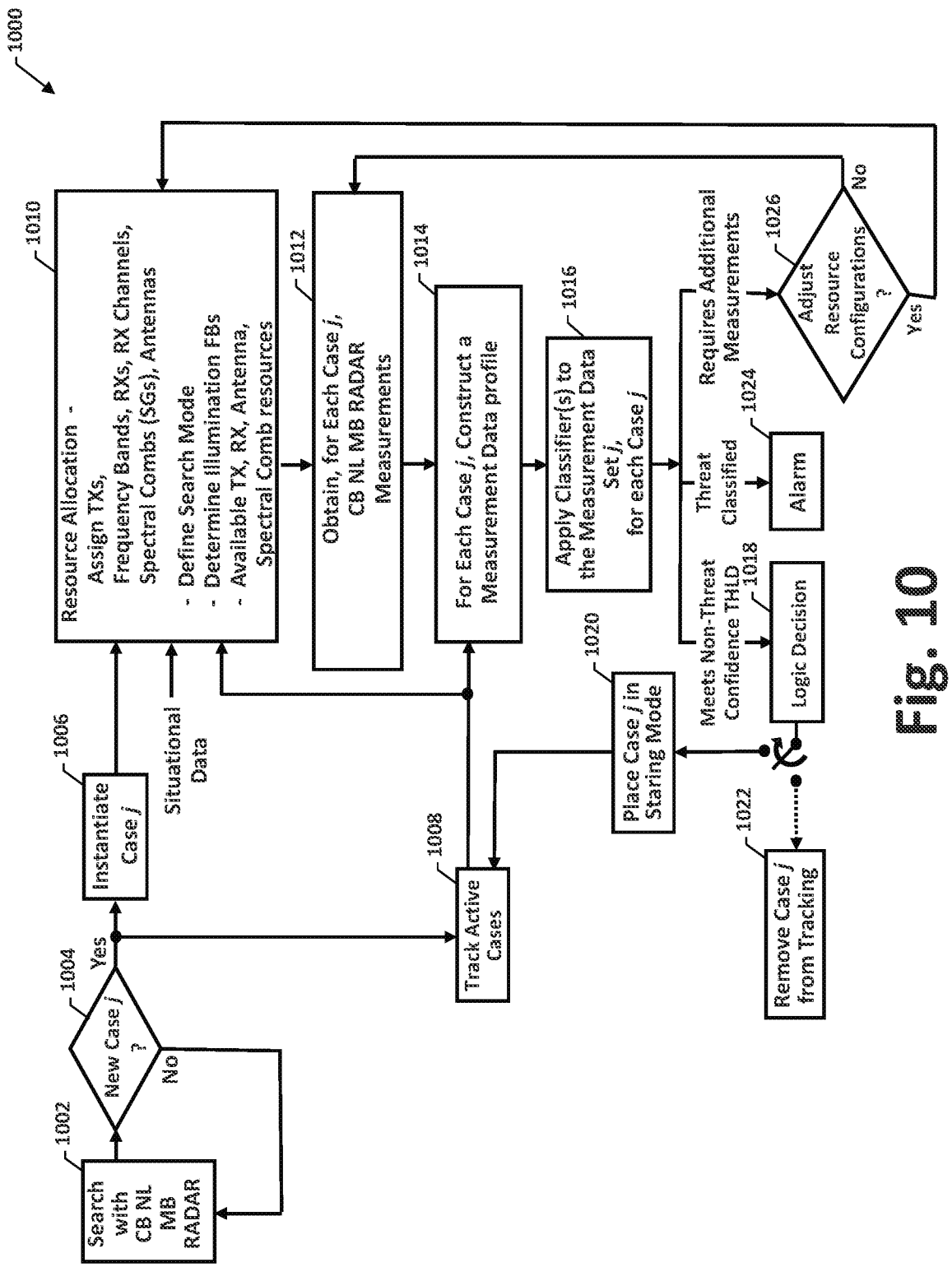

FIG. 10 shows a logic diagram of one example operational flow 1000 of the Radio Frequency (RF) Comb Enabled Nonlinear Multiband Radar System in accordance with one or more embodiments.

Figure 11:
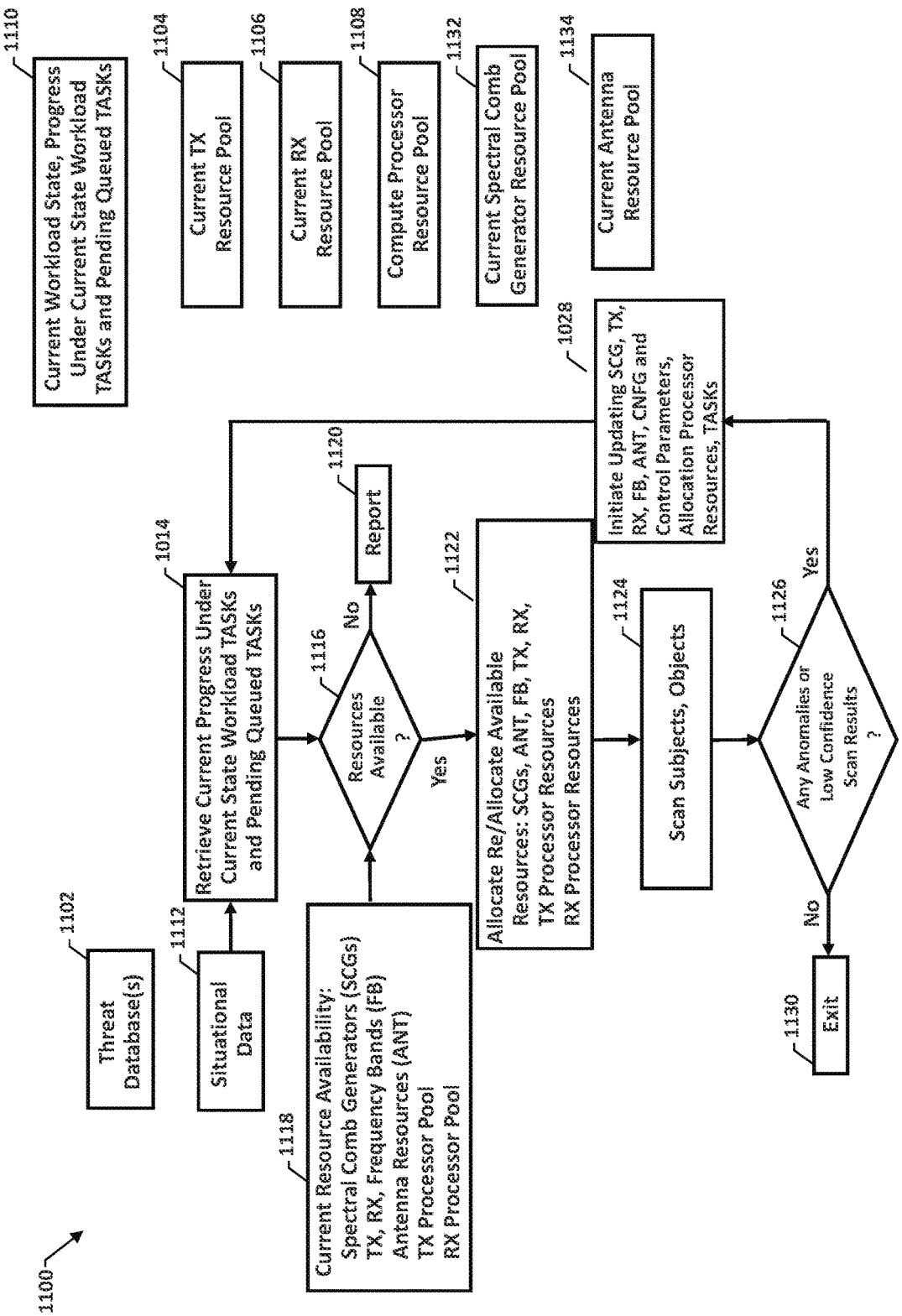

FIG. 11 shows a logic diagram 1100 of a logic flow in a Radio Frequency (RF) Comb Enabled Nonlinear Multiband Radar System (EM NLD Radar System) for configurating resources in accordance with one or more embodiments.

Figure 12:
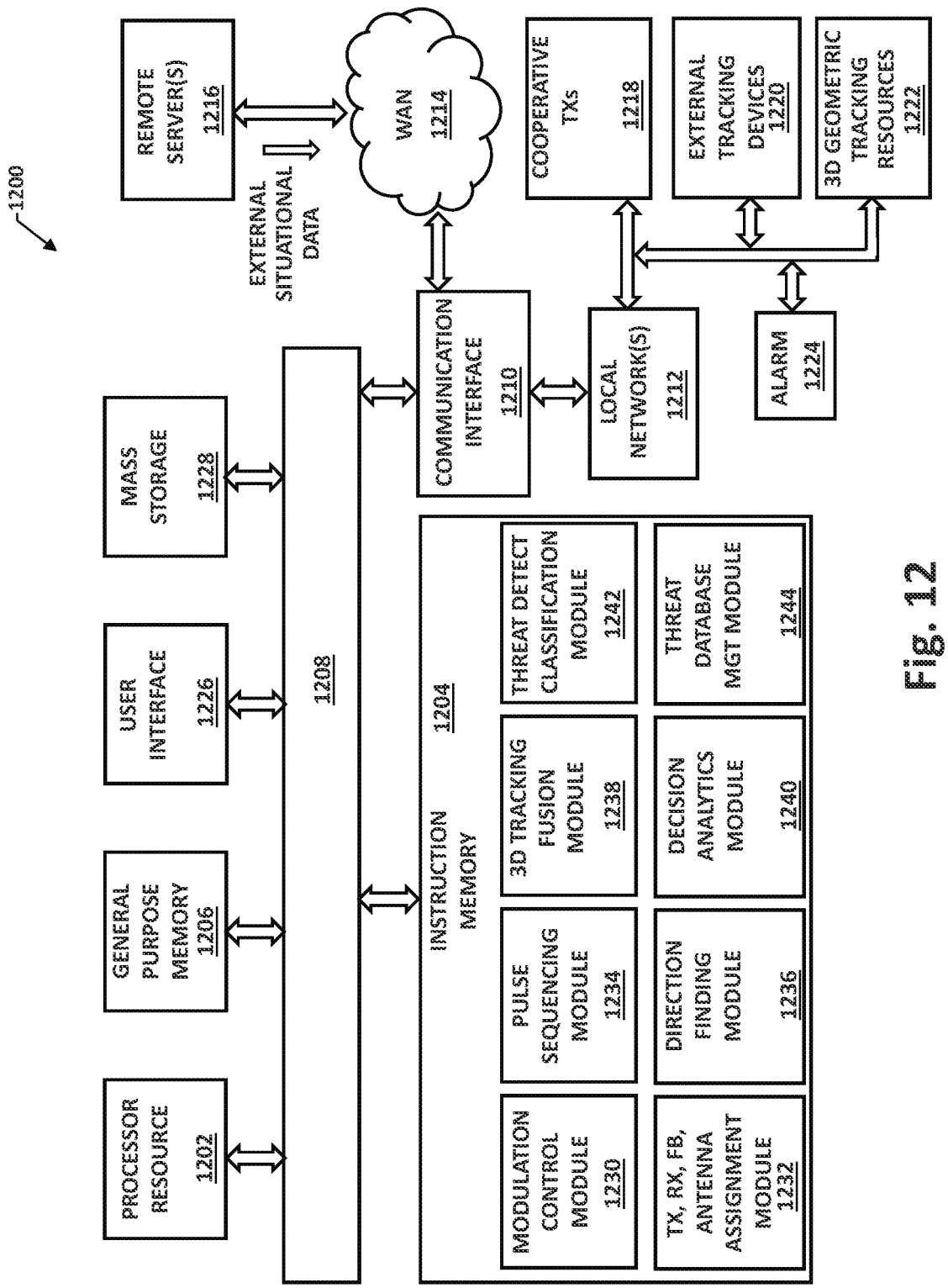

FIG. 12 shows a computer system configured to perform various operations and processes in accordance with disclosed embodiments.

SUMMARY

This Summary is provided to introduce a selection of concepts in a simplified form. These as well as other concepts are further described below in the Detailed Description. This Summary is not intended to identify key features or essential features of the claimed subject matter, nor is it intended to be used to limit the scope of the claimed subject matter.

It will be understood that the scope and meaning of all language appearing in the Summary, including individual words and terms, multi-word phrases and combinations thereof, is subject to reading the disclosure in entirety.

The system disclosed herein, Nonlinear Multiband Detection RF Comb Radar, overcomes the challenges and obstacles to unstructured screening stand-off detection with conventional radar, by using a multiple band radar and utilizing spectrally structured, comb lines, in the broad bandwidth segments of the multiband radar and used to interrogate objects, in the field of view with fusion of all bands for discrimination and detection enhancement.

This patent provides a novel application of radar techniques for nonlinear generation of spectral comb lines for illumination of objects and also employing methods of non-linear detection of molecular signatures to achieve enhanced, accurate identification of chemical compounds, energetic materials, NEPIs and with accurate discrimination.

Six key enabling, aspects of the system of this patent are:
1. Generation of spectral lines by non-linear techniques, (see equations in paragraphs 0022-0028 and FIG. 1, and FIG. 2 for detailed technical discussion),
2. the measurement of the nonlinear interaction between the various spectral lines of the RF pulse provides a measurement the illuminated object's nonlinear dielectric response signature described for illustration by Richert, R., Nonlinear Dielectric Spectroscopy. Springer: 2018 and Lunkenheimer, P.; Michl, M.; Bauer, T.; Loidl, A., Investigation of nonlinear effects in glassy matter using dielectric methods. The European Physical Journal Special Topics 2017, 226 (14), 3157-3183. Such measurements and information can uniquely identify the object's composition being interrogated upon comparison to a reference database of materials and molecules, and when compared to a venue data base, threats are detected accurately, and discrimination is enhanced. The intensity dependent response, combined with dynamic RF beam forming capability enables interrogation of individual people and objects within a desired field of view, thus providing enhanced discrimination by reducing the benign object radar returns (e.g. clutter reduction).

placement of individual spectral comb lines, that are very narrow, can be a few Hz wide, in RF regions that correspond to frequencies that will provide threat responses that can be measured when interrogated by the RF comb enhanced Radar. Frequency location of the spectral lines will be a priori selected or determined by the venue threat list (or referred to as threat data base), that can include energetics, NEPIs and venue-prevalent benign or clutter items in order to provide enhanced detection capability, 3) placement of the spectral comb lines where molecular responses are anticipated, enabling significantly enhanced signal-to-noise ratios and therefore enhanced probability of detection and reduced false alarms, 4) generation of many spectral comb lines that provide interrogating the objects for many threats or clutter items simultaneously, in parallel, hence speeding up the screening process the spectral lines responses also provide angles of arrival for rapid location, the general method described by Brigham, E. Oran, The Fast Fourier Transform and its Applications. Prentice Hall; 1988. Also noting that each spectral line may be used for angles of arrival (AoAs), which provides the capability for simultaneously determining locations of people or objects; hence providing an additional method, other than visible light cameras, to process many people or objects in a short amount of time, key for public venues, especially during the events with a surge in people traffic. Location derived from, RF spectral lines also mitigate occlusions, occlusions typical of visible light cameras, by using buildings or other radar reflective objects behind a person to reflect transmitted signals to illuminate a person's backside and measure the radar return also reflected by the structure behind a person to the radar received of this invention. Hence, AoA, DF and LOB resulting from RF spectral lines, location that can be used for tracking of people and threat localization also avoiding occlusions that occur with wavelengths (typically visible light, infrared or near infrared) from conventional camera systems. However, the Radar of this invention and visible light cameras and infrared cameras may be algorithmically fused for enhanced location of threats and mitigating occlusions.

In the past few years, radio frequency electronics" components enable generation of spectral combs. Using techniques of this patent, the spectral lines may be generated using nonlinear techniques and materials interrogated by the spectral comb, can generate unique responses due to nonlinear molecular effects and the responses may be detected. A method of the disclosed approach is interrogation of objects from three (3) radiated coherent fields (EM-waves) created with the optical generation of a comb spectral lines, mixed with appropriate oscillators to place the comb lines in the desired RF range, power levels, center frequency and bandwidth. The beams illuminating object molecules, generate nonlinear molecular excitation, a resultant material specific signal that is detected by the multiband radar. In our configuration, the non-linear return spectral line is placed in between the original comb lines. Thus, the nonlinear return signal can be efficiently detected with significant reduction of background interference from the original comb lines.

Nonlinear Detection Methods.

Nonlinear detection is enabled by 1) generation of comb lines by nonlinear techniques and 2) measuring nonlinear molecule and material responses resulting from the multiband interrogating, radiated EM waves described below.

The nonlinear generation of spectra comb lines can be achieved by tailoring the spectral lines for the interrogating waveform and the object (material) interrogated providing and nonlinear response from molecular action in response to the interrogating waveform. For example, the RF comb source might have lines at 1 GHz separation, and the structured spectral lines bandwidth centered at 30 GHz. Frequency mixing of the RF comb lines with a different RF center frequency (using conventional mixing techniques; mixers, acousto-optic modulation of the RF source) introduces sidebands in the comb structure. For example, the sidebands of three coherently locked pulses are separately shifted in this example by $v_1=170$ MHz, $v_2=410$ MHz, and $v_3=630$ MHz. The RF field thus can be represented as $E(t)=E_1(t)e^{-i v_1 t}+E_2(t)e^{-i v_2 t}+E_3(t)e^{-i v_3 t}+$(complex conjugates) where $E_1(t)$, $E_2(t)$, and $E_3(t)$ are three separately shaped (i.e., phase and/or amplitude) coherently locked RF comb sources. The shaping of each individual source can be accomplished by means of an arbitrary waveform generator (AWG), or by optical pulse shaping if the RF comb is optically generated. The ability to shape the overall comb spectra of $E_i(t)$, i=1, 2, 3 provides the means to measure chemical species-specific signatures.

Typically, the lowest non-vanishing nonlinear response is of third order (i.e., the second order term vanishes due to symmetry). The third order response signal is given by $P(t) \sim \chi^{(3)}E^3(t)$, where $\chi^{(3)}$ is the spectroscopic time-dependent characteristic susceptibility function of the medium. Thus, the third order polarization response signal will be given by $P(t) \sim \chi^{(3)}(E_1(t)e^{-i v_1 t}+E_2(t)e^{-i v_2 t}+E_3(t)e^{-i v_3 t}+$complex conjugates$)^3$.

Note that (t) actually involves convolution time integrals on the right hand side (RHS) that are not shown for simplicity. The terms that are of primary interest are given by the following combinations of frequencies $P(t) \sim \chi^{(3)}(E_1(t)E_2(t)E_3(t)e^{-i(v1-v2+v3)t}+$permutations+complex conjugates).

Combination bands are distinct from interrogating RF comb pulses.

As a result of the non-linear interaction described above, many spectral lines in bands are generated at the combination frequency of $(v_1-v_2+v_3)$ and others. These bands are distinct from the original bands, along with any pairwise superposition. Importantly, the combination bands are located in between the comb lines and enable significantly reduced background noise for enhanced interrogation and signal detection, in an enhanced coherent heterodyne receiver detection mode. Theoretical models (Princeton, Rabitz lab, unpublished) show that the combination bands have a linewidth of at most 3 times broader in frequency than the original comb lines and thus can also be made extremely narrow (limited only by the interrogation time) thereby enhancing sensitivity to illuminated object specific molecular motion. These bands, with specific molecular motion, can be extracted from the return signal by utilizing standard RF mixing and filtering technology providing low noise detection of the returned signal from the interrogated object. In addition, the shaping of each set of comb lines $E_i(t)$ can uniquely alter the nonlinear spectral response in a chemically specific manner for high sensitivity detection.

Spectroscopic time-dependent characteristic susceptibility function "χ" is a three-dimensional nonlinear function that describes complex (quantum) evolution of the distinct molecular features of the interrogated object (s). The signal measurement is highly informative for material identification of object material; e.g. providing material specificity and along with the multiple band operation, provides enhanced discrimination between threats and benign safe items. The multiband will also provide solutions to signatures of energetics and NEPIs and better image resolution (proportional to wavelength, 10× shorter wavelength provides 10× in resolution), hence the multiband Radar provides enhanced image resolution. The capability to detect and interrogate the suspect materials, "χ" from above, quickly at stand-off range in multiple RF bands will stimulate the chemically specific signatures from molecular interaction that can be exploited for the benefit securing many venues.

The disclosed approach enables the determination of the composition of the dielectric material in a non-metallic enclosure (e.g., behind benign clothing or other personal items) by utilizing the penetrating RF radiation, and allows for detection of explosives and NEPIs and enhanced discrimination with benign objects, that can be venue specific and therefore tailored by products for venue types; enabling only changing of parameters and data bases based on prevalence of threats, benign objects, and threat priorities.

The disclosed approach allows for a significant reduction in the RF detection bandwidth (see FIG. 2.1.$b$) and thus a significant reduction of the noise, e.g. enhanced detection due to noise equivalent bandwidth 10 Log (Bandwidth Reduction), improving the SNR by the narrow spectral lines width versus the total band of the many spectral lines. For example, a 20 GHz wide bandwidth containing the many narrow comb lines, each narrow line of 0.2 GHz, provides a SNR enhancement of 20×for detectability. Spectral line widths of 1 Hz are achievable with current technology, assuming engineering implementation margins of 10×, 10 Hz line width corresponds to a SNR improvement of 100×. And can be enhanced more by exploiting the nonlinear response of dielectric materials using a combination spectral bands of tailored RF radiation and the highly structured RF comb radiation. Enhancement due to these factors are significant.

Additional SNR enhancements are gained by 1) FOV reduction, proportional to 1/FOV$^3$; e.g. reducing x, y, z dimensions each by ½, which is reducing a cube's edges by ½ each=⅛$^{th}$ reduction in volume or potential gains of reduction of benign clutter in FOV, locations of objects and reduction in processing time. Also enhanced ability to handle people traffic loads ⅛ less data needs to be processed, decreasing processor computing demand, enabling a rapid response and making handling people traffic easier.

The disclosed approach allows for the interrogation of an object or multiple objects, as commanded by a processor to desired location coordinate, e.g. $X_m$, $Y_n$, $Z_o$, in conjunction with a beamforming methods. Beamforming methods can be electronic, mechanical and realtime, adaptive beamforming. Realtime adaptive beamforming techniques in combination with non-greedy interrogation probing algorithms can provide a significant speed up over 100×in reaching a detection decision as shown by reference, Dinakarababu, D., Golish, D., and Gehm, M., "Adaptive feature specific spectroscopy for rapid chemical identification," Department of Electrical and Computer Engineering, University of Arizona, 2011. And adaptive approaches further enhance the capability to adequately scan many people or objects simultaneously and have throughput enhancement from parallel RF interrogation, enabled by many simultaneous spectral lines, and utilizing adaptive interrogation as shown in "Adaptive feature specific spectroscopy for rapid chemical identification."

The disclosed approach can be used security screening in public or private venues. Examples of such venues can include, but are not limited to, a school, a place of worship, a sports arena, a concert hall, a movie theater, a hotel, a resort, a park, a city street, a retail establishment, a mass transportation vehicle, such as a bus, a train and taxi.

REFERENCE

1. Richert, R., Nonlinear Dielectric Spectroscopy. Springer: 2018.
2. Lunkenheimer, P.; Michl, M.; Bauer, T.; Loidl, A., Investigation of nonlinear effects in glassy matter using dielectric methods. The European Physical Journal Special Topics 2017, 226 (14), 3157-3183.
3. Lin, T.; Dutt, A.; Ji, X.; Phare, C. T.; Joshi, C.; Gordillo, O. A. J.; Shin, M. C.; Gaeta, A. L.; Lipson, M., Long-Term Stabilization and Operation of a Soliton Micro-Comb for 9-Days, CLEO: Science and Innovations, Optical Society of America: 2019; p STu3J. 5.
4. Ross, D. D.; Konkol, M. R.; Shi, S.; Harrity, C. E.; Wright, A. A.; Schuetz, C. A.; Prather, D. W., Low-profile high-power optically addressed phased array antenna. Journal of Lightwave Technology 2017, 35 (18), 3894-3900.
5. Mazzaro, G. J.; Sherbondy, K. D.; Liao, D., Combined radar assembly with linear and nonlinear radar, U.S. Pat. No. 9,476,973 B2, Oct. 25, 2016.
6. Owen, J.; Blunt, S. D.; Gallagher, K.; McCormick, P.; Allen, C.; Sherbondy, K., Nonlinear radar via intermodulation of FM noise waveform pairs, 2018 IEEE Radar Conference (RadarConf18), IEEE: 2018; pp 0951-0956.
7. Mazzaro, G. J.; Sherbondy, K. D., Harmonic nonlinear radar: from bench top experimentation to short-range wireless data collection, Radar Sensor Technology XXIII, International Society for Optics and Photonics: 2019; p 110030F.
8. Lu, Y; Wang, F.; Gu, J.; Shi, L.; Peng, M.; Lee, C.-h., A Novel Scheme for Photonic Generation of Broadly Tunable Radio Frequency Signals, Asia Communications and Photonics Conference, Optical Society of America: 2017; p Su4E. 4.
9. Morozov, O. G.; Il'in, G. I.; Morozov, G. A.; Nureev, I. I.; Misbakhov, R. S., External amplitude-phase modulation of laser radiation for generation of microwave frequency carriers and optical poly-harmonic signals: an overview, Optical Technologies for Telecommunications 2015, International Society for Optics and Photonics: 2016; p 980711.
10. Preussler, S.; Schwartau, F.; Schoebel, J.; Schneider, $^4$T., Optical signal generation and distribution for large aperture radar in autonomous driving, 2019 12th German Microwave Conference (GeMiC), IEEE: 2019; pp 154-157.

In addition, the references listed herein are also part of the application and are incorporated by reference in their entirety as if fully set forth herein.

DESCRIPTION OF THE DRAWINGS

Description of various concepts and embodiments includes references to the accompanying figures which show illustrative, not limitative examples. It will be understood that figure graphics are scaled for readability and therefore various functions and features are not necessarily drawn with a scale consistent with physical implementations.

As used in this herein, "e.g." and "for example" are mutually interchangeable without change in meaning, and each will be understood to mean "for example, but not limited to".

As used herein, the articles "a" and "an," as used herein in the specification and in the claims, unless clearly indicated to the contrary, understood to mean "at least one".

The term "or" as used herein in contexts such as "A or B" mean "either A or B, or so conjoined, i.e., elements that are conjunctively present in some cases and disjunctively present in other cases.

Description of concepts and features includes reference to example implementations shown on the appended drawings which form part of this disclosure. The example implementations are not intended as a limitation on practices of disclosed concepts and embodiments.

Figure 1:
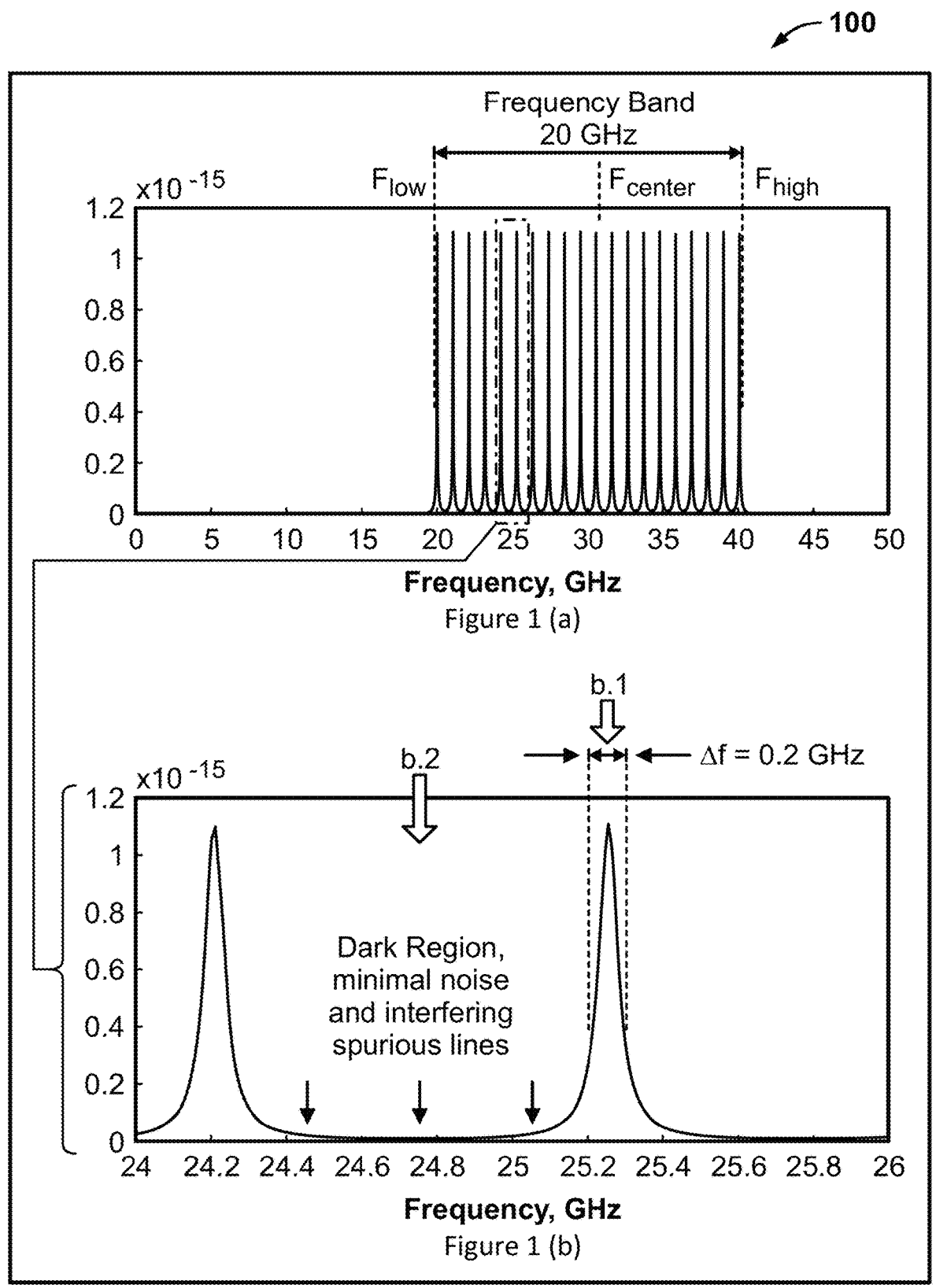
FIG. 1 shows an example Frequency Comb of Spectral Lines, FIG. 1*a*, and Non-linear Generated Spectral Lines FIG. 1*b* with Reduced Background Noise for a Quiet Zone Background (1*b*.1) and very narrow spectral line width (1*b*.2), resulting from excitation processes for Radio Frequency (Rf) Comb Enabled Nonlinear Multiband Radar System in accordance with one or more embodiments.

FIG. 1 shows an example Frequency Comb of Spectral Lines, FIG. 1a, and Non-linear Generated Spectral Lines FIG. 1b with Reduced Background Noise for a Quiet Zone Background (1b.1) and very narrow spectral line width (1b.2), resulting from excitation processes for Radio Frequency (RF) Comb Enabled Nonlinear Multiband Radar System detection of substances of interest (SIs) in accordance with one or more embodiments. FIG. 1(a) is the spectrum of an example RF spectral comb lines with an overall bandwidth of 20 GHz. The comb sequence is shown as flat, but it may be beneficially phase and amplitude shaped to enhance detection or hide the active RF radiation, for example varying the spacing of the spectral lines randomly or applying direct sequence spread spectrum modulation, and polarization to obtain more molecular signatures.

FIG. 1(b) shows the bandwidth of each frequency comb line can be very narrow; here we show as an example (see FIG. 1.b.1) 0.2 GHz bandwidth, while it is also possible to obtain 1 Hz spectral line width with current technology. The reduced noise background region, e.g. minimal interfering frequencies, lower noise also due to reduction of spectral line width and between the comb lines (defined as the "Quiet Zone," see FIG. 1.b1, FIG. 1.b2) may be utilized as the quiet zone for detection of threats. Note the selection of comb spectral lines can be selected by energetics, NEPIs and benign (or choice determined by) SIs including the threat venue data base items, threat prevalence and benign and priority considerations including clutter prevalence that may vary with time of year and geographical locations of venues, e.g. time of year, geographical location of venues may be associated with clothing people may be wearing when approaching a venue.

Figure 2:
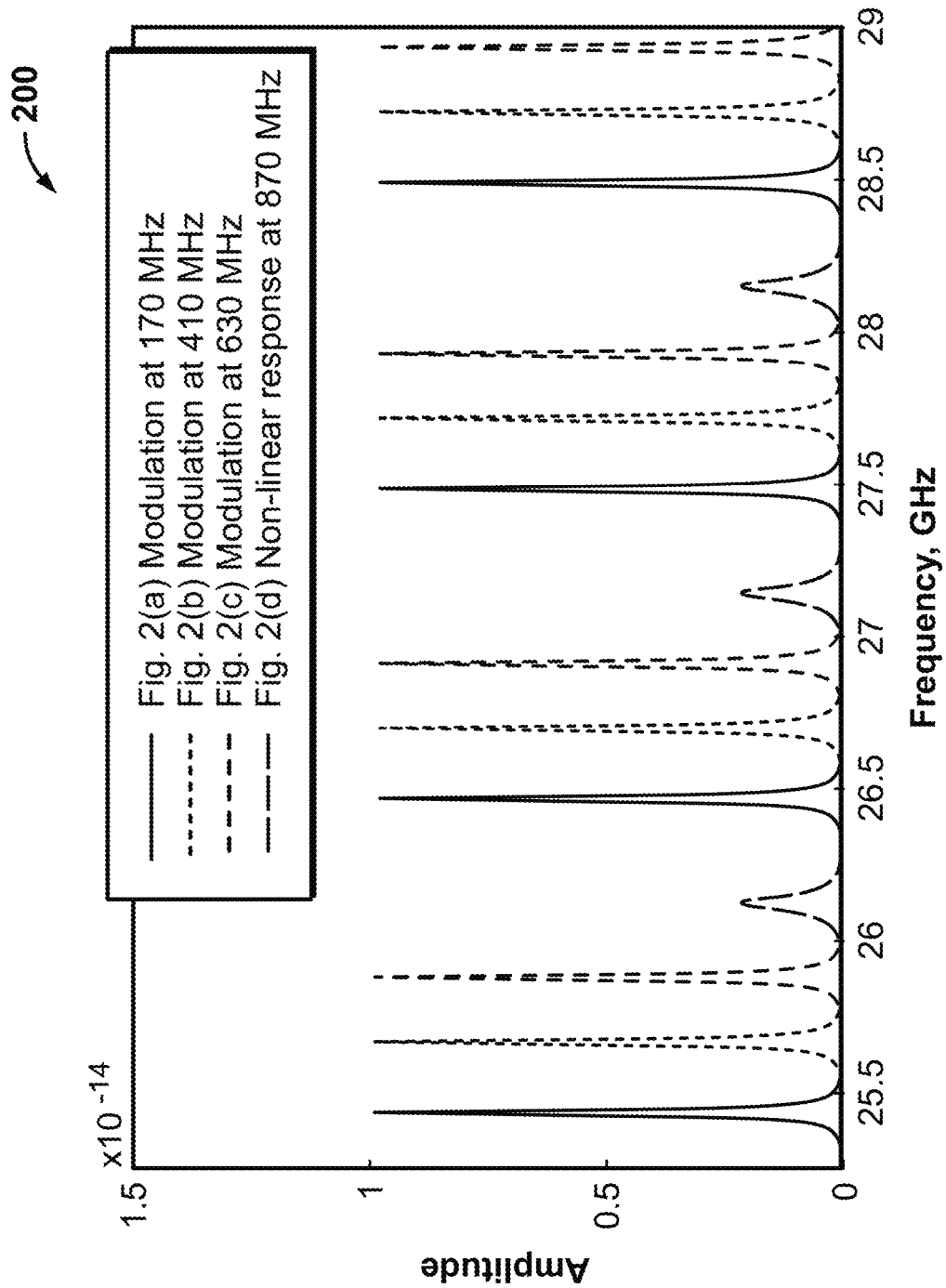
FIG. 2 shows examples of nonlinear generation spectral comb lines used to illuminate.

Non-linear Generated Spectral Lines illustrated between Spectral Comb Lines from FIG. 1 (a);

(1b.1) Narrow Spectral Line Width and (1b.2) with Reduced Background Noise for a Quiet Zone Background between spectral comb lines FIG. 2 shows examples of nonlinear generation spectral comb lines used to illuminate objects, chemical compounds and shows an example, FIG. 2 (d), as a result of interactions of the modulated comb beams (FIG. 2(a), FIG. 2 (b), FIG. 2 (c) shown unshaped for simplicity) with the medium, in accordance with one or more embodiments.
1. FIG. 2a is modulation at 170 MHz in the example set,
2. FIG. 2 (b) is modulation at 410 MHz in the example set,
3. FIG. 2 (c) is modulation at 630 MHz in the example set, and
4. FIG. 2 (d) is a non-linear response signal at 870 MHz in example set.

FIG. 3 shows a functional diagram utilizing spectral line comb generation and conversion to example interrogation-probe frequency bands with the spectral comb lines in accordance with one or more embodiments. FIG. 3(a) is a photo of an Optical Spectral Comb Generator. FIG. 3(b) illustrates the Spectral Comb output as an Intermediate Frequency input to K-Band, X-Band and W-Band frequency conversion RF components that output to antennas for K-Band, X-Band and W-Band.

The figures show an optical comb spectral line generation; other methods of spectral comb line generation may be used. Flexibility of the approach is shown with variables for both the comb generation and frequency conversion for radiating to objects from antennas.

FIG. 4 shows an example functional diagram for frequency comb integration with RF converters and antennas and example frequency shifting of spectral comb lines for heterodyne mixing of return signal from SIs in accordance with one or more embodiments. FIG. 4a and FIG. 4b provide examples of additional details. FIG. 4a shows a functional diagram for frequency comb generator integration with RF converters and antennas for RF comb enabled nonlinear Multiband Radar. FIG. 4b, 400 is the transmit and receiver processing chain and 406. 407 shows a more detailed view of the receiver processing chain of 406, that includes receiving a return signal centered at frequency FC1, 413 converting it for subsequent 412 heterodyne detection with 410 FCI output to recover the (v1−v2+v3) spectral comb as the output of 412. Output of 412, the return signal is processed 411 along with 415 threat data base to identify the 405 object illuminated by 404. Note the transmit processing chain 400 shows 403, three RF converters and 404 shows Tx Antennas, however the spectral lines, (v1−v2+v3), may be transmitted with only one converter in 403 and one antenna in 404.

FIG. 5 shows 501 five individual, separate Spectral Comb Generators for 503 frequency conversion to X, K, W bands and another band called band N. 503 W-band is shown using two individual, separate Spectral Comb Generators from 510 signal 4 and signal 5 output from 503 to 510 IF4 and IF5. W-band output from 503 goes to 504, ports IP3 and out to 505 W-band Antenna. 506 provides the master oscillator and parameter control for the pulse train for via connection 507 to the spectral comb line generator 501. Also 506 provides the general parameters sent to 509 via the 508 Parameter Control Bus. 509 provides the control and commands for the processing chain 501, 502, 503, 504 to be radiated by the antennas 505. It should be noted that spectral comb generators may only use one or a plurality of comb generators and the plurality may each be independent from each other and each plurality provides the intermediate frequency signal for conversion to RF and heterodyne mixing of the return signal from the interrogated object.

FIG. 6 shows a simplified 601 Transmitter and 608 Receiver with a 602 spectral comb generator with a 607 common master clock provided to the transmitter and receiver for coherent operation. General modulation techniques are provided by 603 followed by 604 performing arbitrary band conversion of the spectral comb lines and then transmitted by 605. Master oscillator 611 is provided to the receiver 610 for coherent operation, in accordance with one or more embodiments.

FIG. 7, General system block diagram for applying modulation types to Spectral Comb Lines. Transmitter processing chain is shown in 700 and the receiver processing chain is shown in 706-711. In the 713 transmitter chain, 701 spectral comb line generators can have modulation techniques added in 702, followed by 703 for conversion to desired frequency bands and connected by 704 to reach the 705 antennas for radiating to objects.

FIG. 8, DSE Spread Spectrum example of modulation applied to the General System block diagram, FIG. 7, with appropriate functions to achieve DSE SS transmission and receiving. The DSE transmitter processes are 801 and 803 spectral comb line generation and the receiver processing is shown in 802. Key aspects are the spreading waveform in 804 prior to transmission, and dispreading of the DSE SS in 809. The DSE SS provides a Low probability of Intercept for venues that need to limit discovery of the security radar signals.

FIG. 9 shows occlusion mitigation with 901 the Radio Frequency (RF) Comb Enabled Nonlinear Multiband Radar System with 902 Object of Interest to be illuminated by 901 with radar signal 907. Also other objects are in the surrounding area, 903, 904, and 905. Other objects, 903, 904, 905 can reflect illumination 906 and 907 to 902 and reflect radar signals from 902 back to 901 for processing that provides information not visible with direct ray illumination. Illumination can reflect from many objects, one or a plurality of objects for processing by the radar system 901.

FIG. 10 shows a logic diagram of one example operational flow 1000.

Process 1000 initiates a new case referred to as a 1000 operational flow.

A search is initiated with determination for a new case for scan and analysis as shown in FIG. 10. If a new case is instantiated, resources are allocated and assigned, and process flow of configuring the resources and scanning objects occur as shown in FIG. 11 process flow 1100. As shown in FIG. 10, the process 1000 can proceed to instantiate 1006 a new case. Instantiating 1006 the case, in an embodiment, can include creating an object-specific record. The object-specific record that can include, for example, an initial identifier of the object, such as "Object j" or "Object j+1," and measurement data resulting from process flow 1100, applying 1016 classifier results to the object-specific record. The 1016 classifier outputs a 1024 alarm or a 1018 non-threat confidence or can 1026 require additional measurements. If non-threat confidence meets threshold then the 1022 active case is removed from tracking. If non-threat confidence does not meet the confidence threshold, the case is placed in the 1020 staring mode for more measurements.

FIG. 11 shows a logic diagram 1100 of a logic flow in a Radio Frequency (RF) Comb Enabled Nonlinear Multiband Radar System (EM NLD Radar System) for configurating resources that include TX, RX, Frequency Bands (FBs), Spectral Comb Generators (SCGs), Antenna (ANT) allocation and illuminating objects, receiving return signals, making measurements in an implementation of the FIG. 10 process, in accordance with disclosed embodiments. In an embodiment, the logic flow of the EM NLD Radar System signal configuration and resource allocation algorithm can access one or more threat databases 1102, such as the threat databases that are venue specific, containing energetic materials, NEPIs and benign items. Also, in an implementation, operations include, e.g., as background processes, maintaining what may be realtime inventories of available resource pools, e.g., current TX resource pool 1104, current RX resource pool 1106, current processor resource pool 1108, current spectral comb generator resource pool 1132 and current antenna resource pool 1134. It will be understood that blocks 1104, 1106, 1108, 1132 and 1134 are logic blocks, and that Implementations may merge functions of one or more of the resource pools 1104, 1106, 1108, 1132 and 1134. In an embodiment, background processes can also include maintaining a current workload and case state file 1110, which can include, for example, a listing of current active cases, and for each a status, e.g., resolved, not-yet-resolved, An example instance of a process according to the diagram 1100 (hereinafter "flow 1100") can begin with an event report carried by situational data 1112, e.g., instantiation of a jth case as described above. From the situational data 1112 event report, the flow 1100 can proceed to retrieving 1114 a current workload and case state file as described above, and can then proceed to determining 1116 whether resources are available. The determining can include retrieving 1118 a current resource availability, e.g., retrieving or accessing the current TX resource pool 1104, the current RX resource pool 1106, the current process resource pool 1108, the current spectral comb generator resource pool 1132 and the current antenna resource pool 1134. In an embodiment operations can include, to reduce overhead of accessing the individual pools 1104, 1106, 1108, 1132 and 1134, a pre-processing preparation of an always-ready-to-send unitary report containing requisite information from all of the pools 1104, 1106, 1108, 1132 and 1134.

Referring to FIG. 11, in instances where the determining 1116 produces a negative outcome, the flow 1100 can proceed to a report 1120 operation. In an embodiment, operations associated with reporting 1120 can include automatic temporary allocation of resources.

Assuming a positive result of the determining 1118 (1116 decision), the flow 1100 can proceed to allocating resources, e.g., SCGs, ANT, FB, TX resources, RX resources, and associated TX processor and RX processor resources.

The flow 1100, upon 1114 tasks requested and 1116 ensuring resources are available (SCGs, ANT, FB, TX resources, RX resources, and associated TX processor and RX processor resources) can proceed to scanning 1124 the objects associated with the new case. The flow 1100, upon receiving a result from the FIG. 10 application of classifiers 1016, can proceed to determining whether a result of the classifiers 1016 shows, for example, any anomalies or low confidence scan results. In instances where the determining 1126 indicates "yes," the flow 1100 can proceed to initiating updating 1128 of allocation of resources, e.g., SCG resources, ANT resources, FB resources, TX resources, RX resources, and associated TX processor and RX processor resources. In such instances, the flow 1100 can return to retrieving 1114 a current workload and case state file as described above. The above-described determining 1126 and initiating updating 1128 can be an implementation of the FIG. 10 combination of the "requires additional measurements" output of the classifiers 616 and adjusting Configurations 626. In instances where the 1126 determination indicates "no," the flow 1100 can proceed to exit operation 1130. Examples of exit operations 1130 can be implementation specific.

FIG. 12 shows a computer system 1200 upon which aspects of this disclosure may be implemented. It will be understood that functional blocks illustrated in FIG. 12 are logical blocks, and do not necessarily correspond to particular hardware. The computer system 1200 may include a processing resource 1202 communicatively coupled to an instruction memory 1204 and a general purpose memory 1206 by a bus 1208 for processing information. It will be understood that the instruction memory 1204 and the general purpose memory 1206 are not necessarily implemented by physically separate hardware. For example, the instruction memory 1204 and the general purpose memory 1206 can be respective regions, virtual or physical, of a common memory resource.

The computer system 1200 may also include a communication interface 1210 communicatively coupled to the bus 1208, for two-way data communication to local resources, via local network 1212. The communication interface 1210 may provide, for example through an Internet Service Provider (ISP), connection via a wide area network (WAN) 1214, e.g., the Internet, to a remote server 1216. The computer system 1200 can include, e.g., connected to the bus 1208, a user interface 1226, and a mass storage 1228. The computer system 1200 may be coupled via the bus 1208 to a user interface 1218. The user interface 1218 can include a display and can be configured for receiving various user inputs, such as user command selections and communicating these to the processor 1202, or to the general purpose memory 1206. The user interface 1218 can include physical structure, or virtual implementation, or both, providing user input modes or options, for controlling, for example, a cursor, visible to a user through display or through other techniques, and such modes or operations may include, for example virtual mouse, voice I/O, trackball, or cursor direction keys.

The instruction memory 1204 and the general purpose memory 1206 can be implemented, for example, by one or more random-access memory devices (RAM)s or other dynamic storage device, coupled to the bus 1208 for storing information and executable instructions to be executed by the processor 1202. In an implementation, the executable instructions can be configured as modules that, when executed by the processor, cause the processor to implement a particular logic function or combination of logic functions. FIG. 12 shows an example module configuration that includes, but is not limited to, Modulation Control module 1230, TX, RX, frequency assignment module 1232, Pulse Sequencing module 1234, and a Direction Finding module 1236. The modules implemented by the executable instructions stored in the instruction memory 1204 can also include a Tracking fusion module 1238, a Decision Analytics module 1240, a threat detection and classification module 1242, and a threat database management module 1244.

The general purpose memory 1206 may also be used for storing temporary variables or other intermediate information during execution of instructions by the processor 1202.

In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such the mass storage device 1228. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The instructions also may include program elements, such as an operating system. While execution of sequences of instructions in the program causes the processor 1202 to perform the process steps described herein, hard-wired circuitry may be used in place of, or in combination with, software/firmware instructions for implementation of the processes of the present embodiments. Thus, the present embodiments are not limited to any specific combination of hardware and software.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

General Terms and Conditions

As used herein the terms "comprising," "having," "including," and "containing" are to be understood, except where clearly indicated otherwise, as being open-ended terms (e.g., as meaning "including, but not limited to,") except where clearly stated otherwise.

As used herein in the context of a description of a mechanical feature or aspect, the terms "coupled" and "connected" are to be understood to encompass being mechanically coupled or connected, in a permanent, semi-permanent, or removable manner, as well any one among and any combination or sub-combination of: partly or wholly contained, joined together, attached, secured, mounted, and adhered, either directly to one another or through intervening structure(s).

As used herein, the terms "interfacing," "communicatively connected," and "communicatively coupled" and the like, in the context of operative relation, interaction, control, feedback, or other correspondence between or among functions, modules, logic blocks, or other entities are to be understood as encompassing a possessing or being readily switchable to a mode of possessing a functionality, or operability or capability, having operability or capability, of performing, performing operations in, or initiating a communicating of information, directly or indirectly, wirelessly or wired, encrypted or unencrypted, through any means, including but not limited to circuit network, packet-switching network, reconfigurable point-to-point, or fixed point-to-point, and any combination or sub-combination thereof.

It will be understood that the ordering of description herein of operations in methods and processes is not intended as any limitation on the order in which the operations may be performed in practices of disclosed methods and processes. It will be understood that sequential description herein of operations is not intended to limit practices in accordance with this disclosure to performing the described operations in an order, temporal or locational, separate from another, either in terms of time or location.

The use of any and all examples, and use exemplary language (e.g., "such as"), is intended merely to better illuminate examples of the disclosure and does not pose a limitation on the scope of the disclosure unless otherwise claimed.

The Abstract of the Disclosure is provided to allow the reader to quickly identify aspects of the disclosed subject matter. It is not intended as a limitation on the scope or meaning of the claims.

In the Detailed Description, various features are grouped together in various examples for purposes of streamlining the disclosure. The groupings are not to be interpreted as an indication or implication that any claim requires more features than the claim expressly recites. On the contrary, each appended claim stands on its own as a separately claimed subject matter and therefore each of the appended claims is hereby incorporated into the Detailed Description.

What is claimed is:

1. A system for detecting and classifying items, comprising:
   a tunable frequency comb generator with a plurality of both frequency comb generators and a plurality of comb spectral lines, including a first configuration and a second configuration, each configuration including a first signal that is aligned in frequency on a first spectral line, a second signal that is aligned in frequency on a second spectral line, and a third signal that is aligned in frequency on a third spectral line;
   the first configuration's three signals and the second configuration's three signals using the same frequencies or differing frequencies in any or all of the signals for each spectral line;
   ii) wherein in the first configuration:
      (1) the first spectral line is at the first configuration's first spectral line position, the second spectral line is at the first configuration's second spectral line position, and the third spectral line is at the first configuration's third spectral line position,
      (2) the first configuration's first spectral line position is spaced, in frequency, by the first configuration's first spacing from the first configuration's second spectral line position,
      (3) the first configuration's second spectral line position is spaced, in frequency, by the first configuration's second spacing from the first configuration's third spectral line position, and
      (4) the first configuration's first spacing is greater than the first configuration's second spacing, and
   iii) wherein in the second configuration:
      (1) the first spectral line is at the second configuration's first spectral line position, the second spectral line is at the second configuration's second spectral line position, and the third spectral line is at the second configuration's third spectral line position,
      (2) the second configuration's first spectral line position is spaced, in frequency, by the second configuration's first spacing from the second configuration's second spectral line position,
      (3) the second configuration's second spectral line position is spaced, in frequency, by the second configuration's second spacing from the second configuration's third spectral line position, and
      (4) the second configuration's first spacing is less than the second configuration's second spacing, and
   iv) wherein in the first and second configurations:
      (1) the first configuration's first spectral line, in frequency, equals the second configuration's first spectral line, in frequency, for all assigned frequencies, and
   b) at least one transmitting antenna apparatus communicatively coupled to the tunable frequency comb generator and configured to radiate transmission signals from at least one of the first configuration and the second configuration toward a target region, the transmission signals comprising at least a first transmission signal that is based on the first signal, a second transmission signal that is based on the second signal, and a third transmission signal that is based on the third signal, and
   c) a receiving antenna apparatus configured to receive return signals from an object in the target region responsive to the object being illuminated by the transmitted signals, and
   d) a coherent receiver configured to be changeable between a first coherent heterodyne configuration and a second coherent heterodyne configuration wherein:
      i) the first coherent heterodyne configuration comprises a heterodyne mixing of the return signals with first mixing signals, the first mixing signals being synchronized with the first configuration's frequency position of the first spectral line, the first configuration's frequency position of the second spectral line, and the first configuration's frequency position of the third spectral line, and
      ii) the second coherent heterodyne configuration comprises a heterodyne mixing of the return signals with second mixing signal, the second mixing signals being synchronized with the second configuration's frequency position of the first spectral line, the second configuration's frequency position of the second spectral line, and the second configuration's frequency position of the third spectral line, and
   e) a sampler configured to sample an output of the coherent receivers and output a sample stream, and
   f) a classifier, configured to detect based on the sample stream, whether an object of interest that is illuminated within the target region exceeds a threshold, and
   g) a frequency distribution network to connect frequency band signals with spectral combs to antennas, and
   h) a frequency distribution network to connect antennas to receivers.

2. The system of claim 1, wherein control parameters modifying the signal derived from the spectral comb generator modifies the frequency spacing of the spectral lines for equally spacing, non-equally spacing, independent spacing, pseudo randomly spacing or randomly spacing.

3. The system of claim 1, wherein control parameters modifying the signal derived from the spectral comb generator are frequency, amplitude, polarization and phase and time sequencing of each parameter in relation to the other parameters.

4. The system of claim 1, wherein a control parameter modifies the signal derived from the spectral comb generator and each parameter individually or a plurality of parameters may be time varying.

5. The system of claim 1, wherein a parameter modifying the signal derived from the spectral comb generator such that frequency parameters varies, phase parameters comprising phase constellations, amplitude comprises a plurality of amplitudes, and polarization comprises a plurality of polarization patterns.

6. The system of claim 1, wherein parameters modifying the signal derived from the spectral comb generator are encoded independently as random variables, all variables are changed with other variables or be sequenced together or in a pattern of independent variables.

7. The system of claim 1, wherein frequency spacing between the lines is an inverse of a pulse repetition rate of the optical frequency comb.

8. The system of claim 1, wherein the plurality of modulators comprises acousto-optic or electro-optic modulators or combination of modulators.

9. The system of claim 1, wherein a plurality of comb generators comprise two spectral comb generators to individually generate two combs utilized for radiating objects and an additional comb generator utilized for heterodyne detection.

10. The system of claim 1, wherein the comb generator spectral lines are converted to a different frequency range or band, designated by Frequency Low FL and Frequency High FH, providing combs originating from a different frequency band, to the converted frequency band, spanning a bandwidth at the difference frequency (FH minus the FL).

11. The system of claim 1, wherein the plurality of photodiodes comprise broad band photodiodes.

12. The system of claim 1, wherein radiating devices are used to radiate the spectral combs with or without frequency conversion, to objects.

13. The system of claim 1, wherein a receiver is configured to receive return signals from radiated objects that comprises a nonlinear response signal and linear response signals, has the filtering and selectivity to receive and process the returned signals for the purpose of enhanced SNR and detection and discrimination of chemical compounds.

14. The system of claim 1, wherein an object is identified by comparing the returned signal characterization to a database containing chemical compounds of interest and their known characterization due the electromagnetic signal probing.

15. The system of claim 1, wherein spectral comb line transmission and return responses from object or objects illuminated are used for a general search for objects of interest.

16. The system of claim 1, wherein the object illuminated, by the plurality of spectral lines, uses the plurality of spectral lines to achieve enhanced dielectric measurement for object identification.

17. A system for detecting and classifying concealed items, comprising a nonlinear spectral comb system radar signal that detects the chemical composition of an object and discriminates threats from benign objects comprising:
   a. a frequency comb signal configured with a plurality of spectral lines, and
   b. a plurality of frequency comb signals that each can be configured with a plurality of frequency spectral combs, and
   c. the frequency combs are used for any frequency band, wherein a portion of the frequency band utilize zero, one, or a plurality of frequency combs, and
   d. the conversion of the comb spectral lines to different spectral bands, via a plurality of photodiodes configured to convert the plurality of combs to other spectral combs in other frequency bands,
   e. the transmission of one or a plurality of spectral frequency combs to illuminate an object or objects such that a return signal or signals can be received from the objects illuminated by the transmitted signals,
   f. the reception of the return signals from the illuminated object or objects wherein the return signal or signals can include both linear and nonlinear responses generated from the illuminated objects,
   g. use of narrow spectral comb lines to enhance SNR by reducing noise bandwidth,
   h. the selection of comb frequencies and spacing and material response characterization to reduce interference from frequency conversion, adjacent spectral lines that reduce dynamic range, and clutter rejection utilizing a comb structured spectral transmission filter,
   i. the detection of the nonlinear response signal from an illuminated object by transmitting the illuminating comb frequencies that are derived from a Taylor Series expansion, of the source comb frequency which in turn defines a return spectral line from the illuminated object at a different frequency from the illuminating signals, and
   j. the down conversion of the return signal from a transmitter-illuminated object and the down conversion of the derived signal from the frequency spectral comb signal used for transmitting in a coherent manner, and
   k. an output signal from heterodyne mixing of the resultant return signal and derived signal that can be used for analysis of chemical composition of the object illuminated, and
   l. a reference database of energetics, NEPIs and benign items that can be used for matching, for example, analytical comparison, with the output signal from an illuminated object for threat determination, and
   m. a machine learning capability to improve identification and recognition performance, and
   n. an alerting function that provides external systems and/or users with specific information about the object that caused the alarm.

18. The system of claim 17, wherein the comb generator spectral lines are converted to different spectral regions, or bands via a plurality of photodiodes configured to convert the plurality of combs to desired frequency combs.

* * * * *